US011437915B2

(12) United States Patent
Jin et al.

(10) Patent No.: US 11,437,915 B2
(45) Date of Patent: Sep. 6, 2022

(54) CONVERTER

(71) Applicant: Delta Electronics, Inc., Taoyuan (TW)

(72) Inventors: Da Jin, Taoyuan (TW); Dongjie Gu, Taoyuan (TW); Xueliang Chang, Taoyuan (TW); Shengli Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/339,139

(22) Filed: Jun. 4, 2021

(65) Prior Publication Data
US 2021/0408924 A1 Dec. 30, 2021

(30) Foreign Application Priority Data

Jun. 24, 2020 (CN) .......................... 202010589162.9

(51) Int. Cl.
*H02M 3/335* (2006.01)
*H02M 1/14* (2006.01)

(52) U.S. Cl.
CPC ......... *H02M 3/33576* (2013.01); *H02M 1/14* (2013.01)

(58) Field of Classification Search
CPC ............. H02M 3/335; H02M 3/33576; H02M 3/33569; H02M 3/33571; H02M 3/33573; H02M 3/33515; H02M 1/14
See application file for complete search history.

(56) References Cited

U.S. PATENT DOCUMENTS

| 10,199,950 | B1 | 2/2019 | Vinciarelli et al. |
| 10,615,698 | B2* | 4/2020 | Chang ............... H02M 3/33569 |
| 2022/0014104 | A1* | 1/2022 | Yang ................. H02M 3/33576 |
| 2022/0051842 | A1* | 2/2022 | Chang ....................... H01F 3/10 |

FOREIGN PATENT DOCUMENTS

| CN | 104009645 B | 9/2016 | |
| EP | 3840204 A2 * | 6/2021 | ............ G06F 13/374 |

OTHER PUBLICATIONS

D. Huang, X. Wu and F. C. Lee, "Novel non-isolated LLC resonant converters," 2012 Twenty-Seventh Annual IEEE Applied Power Electronics Conference and Exposition (APEC), 2012, pp. 1373-1380.

* cited by examiner

*Primary Examiner* — Adolf D Berhane
(74) *Attorney, Agent, or Firm* — Kirton McConkie; Evan R. Witt

(57) ABSTRACT

A converter includes a first end, a second end, a first side and a second side switching circuits and a transformer. The first end includes a first positive terminal and a first negative terminal. The second end includes a second positive terminal and a second negative terminal. The first side switching circuit is coupled to the first end and includes a first bridge arm and a second bridge arm. Two terminals of the first bridge arm are coupled to the first positive terminal and the first negative terminal respectively. Two terminals of the second bridge arm are coupled to the first positive terminal and the second positive terminal respectively. The transformer includes a first side winding coupled to the first side switching circuit and a second side winding coupled to the second side switching circuit. The turns ratio of the first side winding and the second side winding is N:1.

18 Claims, 7 Drawing Sheets

CONVERTER

CROSS-REFERENCE TO RELATED APPLICATION

This application claims priority to China Patent Application No. 202010589162.9, filed on Jun. 24, 2020, the entire contents of which are incorporated herein by reference for all purposes.

FIELD OF THE INVENTION

The present disclosure relates to a converter, and more particularly to a converter capable of realizing non-integer voltage conversion ratio.

BACKGROUND OF THE INVENTION

With the rapid development of the internet and artificial intelligence, power supplies with high efficiency and high power density have become more popular. For example, during power transmission, in order to reduce the transmission loss, the voltage needs to be increased from 12V to 54V. When the power is actually supplied, the voltage needs to be reduced from 54V to 12V. Since 54V is a non-integer multiple of 12V, the structure or control method of the transformer needs to be adjusted accordingly to achieve a non-integer voltage conversion ratio.

As for the conventional converter, there are two solutions to achieve a non-integer voltage conversion ratio (take the voltage conversion ratio of N+0.5 as an example). One solution is to directly adjust the turns ratio between the primary winding and the secondary winding of the transformer to a non-integer multiple. However, since the number of turns of the winding must be an integer, the turns ratio of the windings of the transformer needs to be set to (2N+1):2 so as to achieve a voltage conversion ratio of N+0.5. That is, the total number of turns of the windings of the transformer is at least (2N+3). Therefore, the total number of turns will result in excessive winding losses, which affects the efficiency of the transformer. The other solution is to maintain the turns ratio of the windings of the transformer to (N+1):1 and adjust the switching frequency of the switching circuit, thereby achieving a voltage conversion ratio of (N+0.5). However, because the switching frequency deviates from the resonant operating point, it is difficult to design the resonant parameters, and the inductance of the resonant inductor increases, resulting in a smaller magnetizing inductance of the transformer. Therefore, the voltage conversion loss of the converter becomes larger.

SUMMARY OF THE INVENTION

It is an object of the present disclosure to provide a converter. The turns ratio of the first side winding and the second side winding of the transformer of the converter is N:1, where N is a positive integer. A non-integer voltage conversion ratio can be achieved through adjusting the connection arrangement of the switching circuit at the high voltage side. Thereby, the winding loss of the transformer of the converter is not increased because the number of turns of the windings of the transformer is not increased. Further, since the switching frequency of the switching circuit is equal to the resonant frequency, it is convenient to design and optimize the resonant parameters. In addition, the inductance of the resonant inductor is reduced, which causes the magnetizing inductance of the transformer to be increased, thereby improving the conversion efficiency of the converter.

In accordance with an aspect of the present disclosure, there is provided a converter. The converter includes a first end, a second end, a first side switching circuit, a second side switching circuit and a transformer. The first end has a first positive terminal and a first negative terminal. The second end has a second positive terminal and a second negative terminal. The first side switching circuit is coupled to the first end and includes a first bridge arm and a second bridge arm. Two terminals of the first bridge arm are coupled to the first positive terminal and the first negative terminal respectively. Two terminals of the second bridge arm are coupled to the first positive terminal and the second positive terminal respectively. The transformer is between the first side switching circuit and second side switching circuit. The transformer includes a first side winding coupled to the first side switching circuit and a second side winding coupled to the second side switching circuit. The turns ratio of the first side winding and the second side winding is N:1, and the voltage conversion ratio of the first end and the second end is N+0.5:1, where N is a positive integer.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
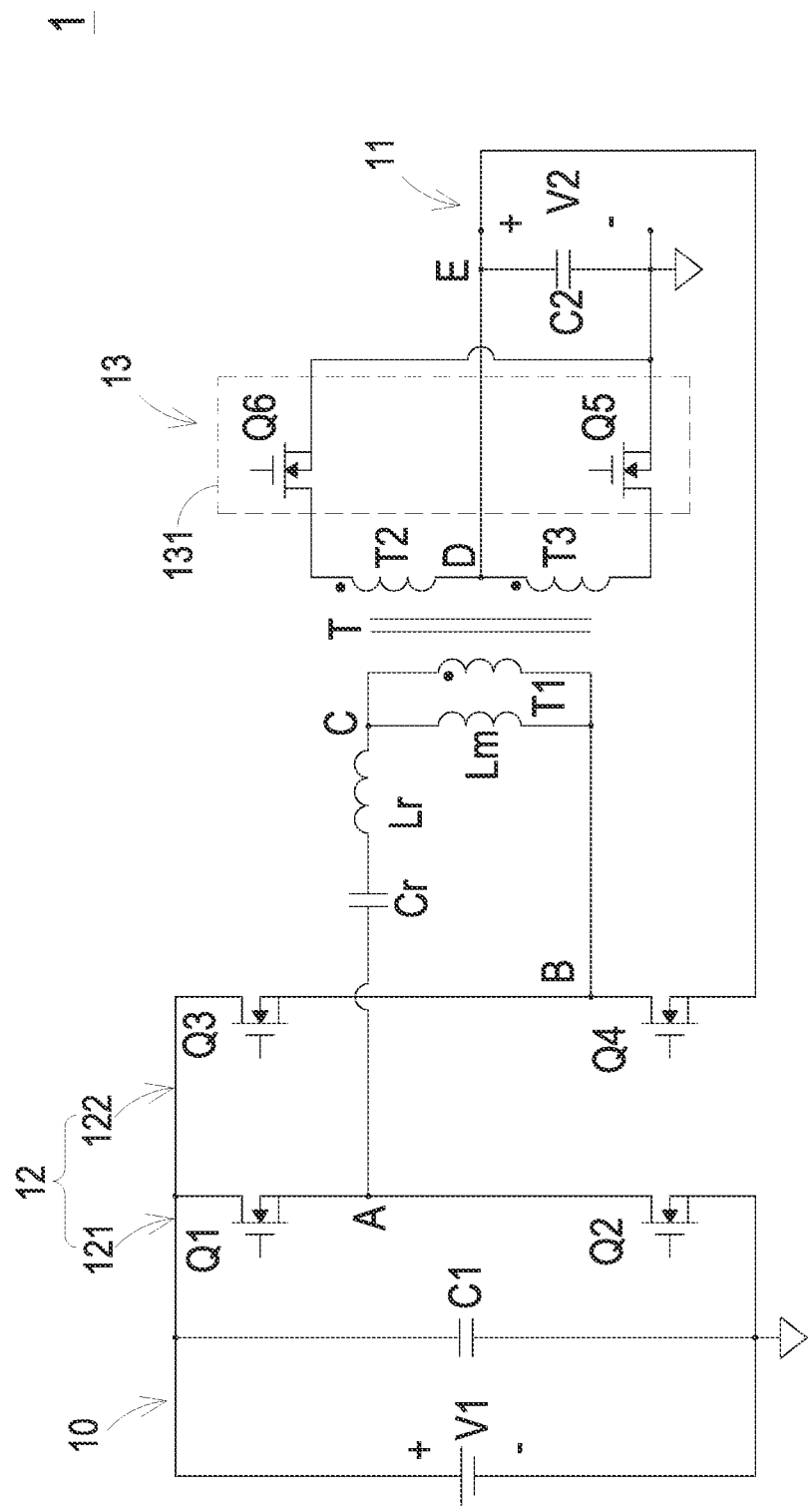
FIG. 1 is a schematic circuit diagram illustrating a converter according to an embodiment of the present disclosure.

FIG. 1 is a schematic circuit diagram illustrating a converter according to an embodiment of the present disclosure. In this embodiment, the converter 1 is a full-bridge LLC resonant converter, and the converter 1 includes a first end 10, a second end 11, a first side switching circuit 12, a second side switching circuit 13 and a transformer T. The first end 10 has a first side voltage V1 and includes a first positive terminal V1+ and a first negative terminal V1−. The second end 11 has a second side voltage V2 and includes a second positive terminal V2+ and a second negative terminal V2−. The first negative terminal V1− and the second negative terminal V2− are both grounded and electrically connected to each other. The first side switching circuit 12 is coupled to the first end 10 and includes a first bridge arm 121 and a second bridge arm 122. Two terminals of the first bridge arm 121 are coupled to the first positive terminal V1+ and the first negative terminal V1− respectively. Two terminals of the second bridge arm 122 are coupled to the first positive terminal V1+ and the second positive terminal V2+ respectively. The second side switching circuit 13 is coupled to the second end 11. The second side switching circuit 13 is for example but not limited to a center-tap rectifier circuit, a full-bridge rectifier circuit, or a half-bridge rectifier circuit. The transformer T is coupled between the first side switching circuit 12 and the second side switching circuit 13. The transformer T includes at least one first side winding and at least one second side winding, and the at least one first side winding is magnetically coupled to the at least one second side winding. The first side winding is coupled to the first side switching circuit 12, and the second side winding is coupled to the second side switching circuit 13. The turns ratio of the first side winding and the second side winding is N:1, where N is a positive integer.

The turns ratio of the first side winding and the second side winding of the converter 1 is N:1, and by coupling the second bridge arm 122 to the second end 11, the voltage conversion ratio of non-integer multiple is realized. For example, the operation of the converter 1 may have a first working state and a second working state according to different switch control. In the first working state, a part of energy of the first end 10 is transferred to the second end 11 through the magnetic coupling of the transformer T, and the other part of energy of the first end 10 is transferred to the second end 11 through the second bridge arm 122. In the second working state, the energy of the first end 10 is transferred to the second end 11 through the magnetic coupling of the transformer T. Thereby, the voltage conversion ratio of non-integer multiple of the converter 1 can be achieved. In this embodiment, the converter 1 receives the voltage at the first end 10 and outputs the voltage at the second end 11. In other embodiments, the converter 1 can receive the voltage at the second end 11 and output the voltage at the first end 10. Under this circumstance, the converter 1 can also achieve a voltage conversion ratio of non-integer multiple based on the same or similar principle, the difference may involve the direction of voltage or current, so the operation process is not described in detail here.

In the present disclosure, the turns ratio of the transformer of the converter 1 is N:1, and a voltage conversion ratio of non-integer multiple can be achieved through adjusting the connection arrangement of the switching circuit at the high voltage side. Because the number of turns of the transformer windings does not increase, the winding loss does not increase accordingly. Since the switching frequency of the switching circuit is substantially identical to the resonant frequency, it is convenient to design and optimize the resonant parameters. In addition, the inductance of the resonant inductor will be reduced, which causes the magnetizing inductance of the transformer to increase, thereby improving the conversion efficiency of the converter.

In an embodiment, the transformer T may be a center-tap transformer and includes a first side winding T1 and two series-connected second side windings T2 and T3. The turns ratio of the first side winding T1 and the second side windings T2 and T3 is N:1:1, but is not limited thereto.

The first bridge arm 121 includes a first switch Q1 and a second switch Q2 coupled in series, and there is a first node A between the first switch Q1 and the second switch Q2. That is, the first node A is the common node of the first switch Q1 and the second switch Q2. The second bridge arm 122 includes a third switch Q3 and a fourth switch Q4 coupled in series, and there is a second node B between the third switch Q3 and the fourth switch Q4. Similarly, the second node B is the common node of the third switch Q3 and the fourth switch Q4. The first side winding T1 is coupled in series between the first node A and the second node B, and there is a third node C between the first node A and the first side winding T1.

In an embodiment, the converter 1 includes a first capacitor C1 and a second capacitor C2. The first capacitor C1 is coupled to the first end 10 in parallel, and the second capacitor C2 is coupled to the second end 11 in parallel. The equivalent magnetizing inductor Lm of the transformer T is shown in FIG. 1, the magnetizing inductor Lm is coupled to the first side winding T1 in parallel, and the two terminals of the magnetizing inductor Lm are coupled to the second node B and the third node C respectively. The converter 1 further includes a resonant capacitor Cr and a resonant inductor Lr. The resonant capacitor Cr and the resonant inductor Lr are coupled in series between the first node A and the third node C. The resonant capacitor Cr and the resonant inductor Lr have a resonant frequency fr, and the resonant frequency fr is equal to or approximately equal to the switching frequency of the first side switching circuit 12. The resonant inductor Lr may be the equivalent leakage inductance of the transformer T or an inductor outside the transformer T. When the resonant inductor Lr is the leakage inductance of the transformer T, the resonant capacitor Cr and the resonant inductor Lr are coupled in series between the first node A and the second node B.

The second side switching circuit 13 includes a switching circuit unit 131. In an embodiment, the switching circuit unit 131 includes a fifth switch Q5 and a sixth switch Q6 coupled in series. The fifth switch Q5 and the sixth switch Q6 are coupled to two terminals of the second side windings T2 and T3 respectively. There is a fourth node D between the second side windings T2 and T3, and the fourth node D is coupled to the second positive terminal V2+.

In some embodiments, the switches Q1-Q6 can be transistors, such as metal oxide semiconductor field effect transistor (MOSFET), double carrier junction transistor (BJT) or insulated gate bipolar transistor (IGBT), but not limited thereto.

The following takes the embodiment shown in FIG. 1 as an example to specifically describe the circuit operation in the first and the second working states.

Figure 2:
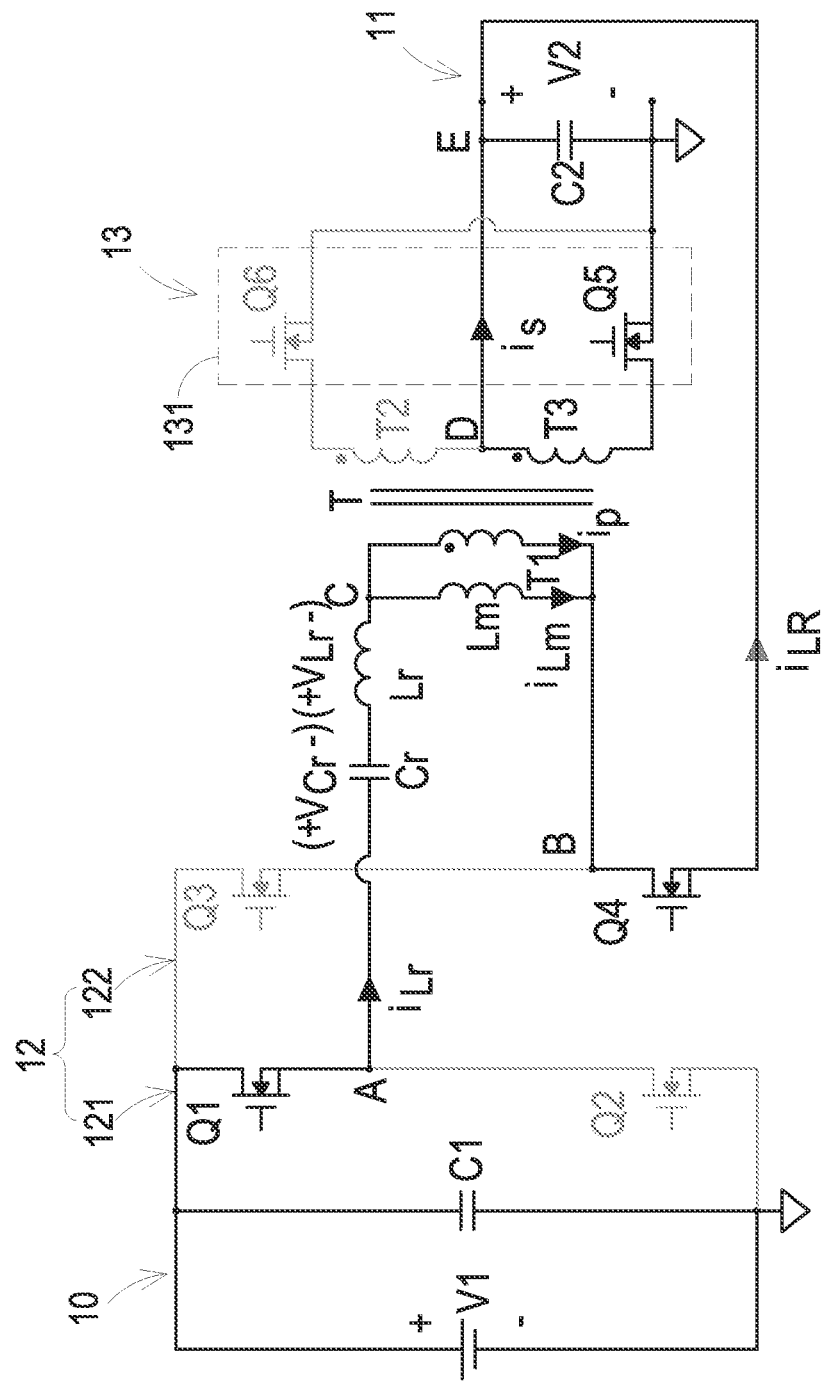
FIG. 2 is a schematic circuit diagram illustrating the operation of the converter of FIG. 1 in a first working state.
Figure 3:
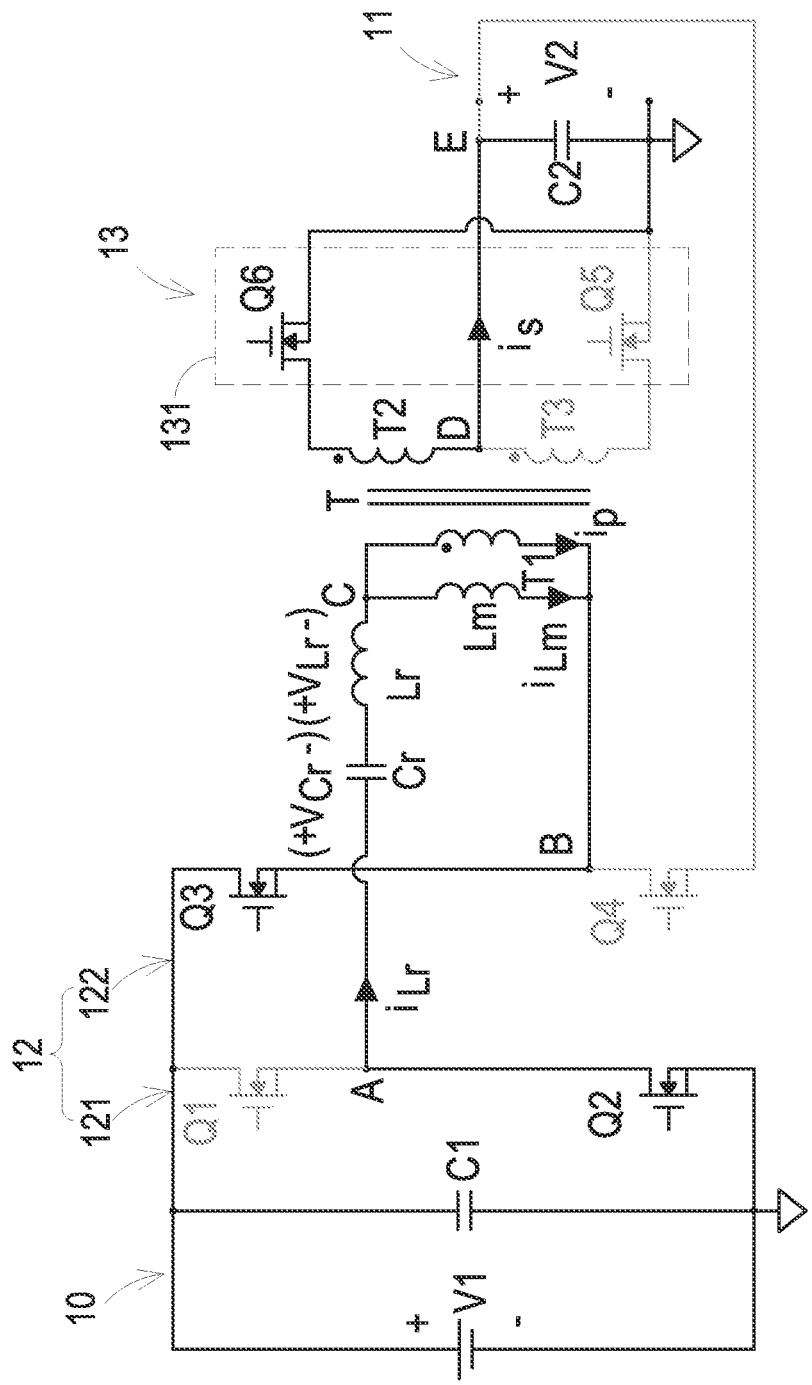
FIG. 3 is a schematic circuit diagram illustrating the operation of the converter of FIG. 1 in a second working state.

In the following example, the converter 1 receives the voltage at the first end 10 and outputs the voltage at the second end 11. In another embodiment, the converter 1 can receive the voltage at the second end 11 and output the voltage at the first end 10, a non-integer voltage conversion ratio of non-integer multiple of the converter 1 can also be achieved with the same or similar principle, the difference may involve the direction of voltage or current, and the detailed descriptions thereof are omitted herein. Please refer to FIGS. 2 and 3. FIGS. 2 and 3 are schematic circuit diagrams illustrating the operation of the converter of FIG. 1 in a first working state and in a second working state respectively. The duty cycle of the first working state and the second working state of the converter 1 are both 50%. In the first working state, the first switch Q1, the fourth switch Q4, and the fifth switch Q5 are turned on, and the second switch Q2, the third switch Q3, and the sixth switch Q6 are turned off. The voltage $V_{AB}$ between the first node A and the second node B is shown in formula (1).

$$V_{AB}=V1-V2 \quad (1)$$

Also, the voltage between the first node A and the second node B can also be expressed as a calculation formula related to the resonant capacitor Cr, the resonant inductor Lr, and the second side voltage V2, which is shown in formula (2). $V_{Cr}$ is the DC component of the voltage of the resonant capacitor Cr, $\Delta v_{Cr}$ is the AC component of the voltage of the resonant capacitor Cr, and $V_{Lr}$ is the voltage of the resonant inductor Lr.

$$\begin{aligned} V_{AB} &= V1 - V2 \\ &= V_{Cr} + \Delta v_{Cr} + V_{Lr} + N \cdot V2 \end{aligned} \quad (2)$$

In the second working state, the second switch Q2, the third switch Q3 and the sixth switch Q6 are turned on, and the first switch Q1, the fourth switch Q4 and the fifth switch Q5 are turned off. The switches in the first and second working state are switched by 180 degrees out of phase with each other. For example, the first switch Q1, the fourth switch Q4 and the fifth switch Q5 in the first working state have a first conduction phase, and the second switch Q2, the third switch Q3 and the sixth switch Q6 in the second working state have a second conduction phase, the phase difference is substantially equal to 180 degrees between the first conduction phase and the second conduction phase. The voltage between the first node A and the second node B is shown in formula (3).

$$V_{AB}=0-V1 \quad (3)$$

Also, the voltage between the first node A and the second node B can be expressed as a calculation formula related to the resonant capacitor Cr, the resonant inductor Lr and the second side voltage V2, which is shown in formula (4).

$$\begin{aligned} V_{AB} &= 0 - V1 \\ &= V_{Cr} + \Delta v_{Cr} + V_{Lr} - N \cdot V2 \end{aligned} \quad (4)$$

In this embodiment, due to the switching frequency of the first side switching circuit 12 approximately equal to the resonant frequency fr, the sum of the AC component of the voltage $\Delta v_{Cr}$ of the resonant capacitor Cr and the voltage $V_{Lr}$ of the resonant inductor Lr can be approximately equal to 0. Therefore, formulas (2) and (4) can be approximately simplified to formulas (5) and (6) respectively.

$$V1-V2=V_{Cr}+N \cdot V2 \quad (5)$$

$$-V1=V_{Cr}-N \cdot V2 \quad (6)$$

According to formulas (5) and (6), the relation between the first side voltage V1, the second side voltage $V_2$ and the DC component of the voltage $V_{Cr}$ of the resonant capacitor Cr is shown in formulas (7) and (8).

$$V1=(N+0.5) \cdot V2 \quad (7)$$

$$V_{Cr}=-0.5 \cdot V2 \quad (8)$$

As shown in formulas (7) and (8), it can be seen that the voltage ratio of the first side voltage V1 to the second side voltage V2 is (N+0.5):1, that is, a voltage conversion ratio of non-integer multiple is realized. The DC component of the voltage $V_{Cr}$ of the resonant capacitor Cr is 0.5 times the second side voltage V2.

Figure 4:
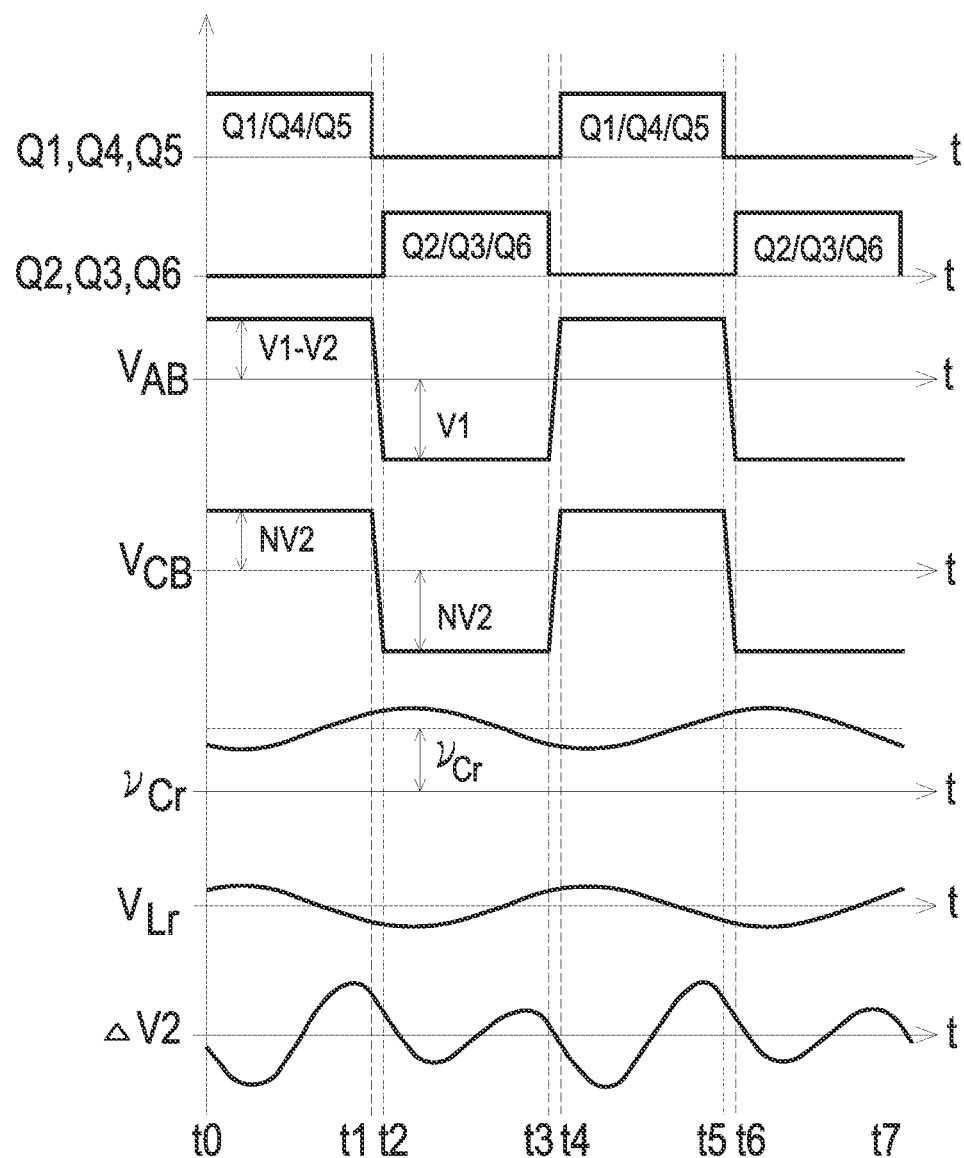
FIG. 4 is a schematic voltage waveform diagram of the converter of FIG. 1.
Figure 5:
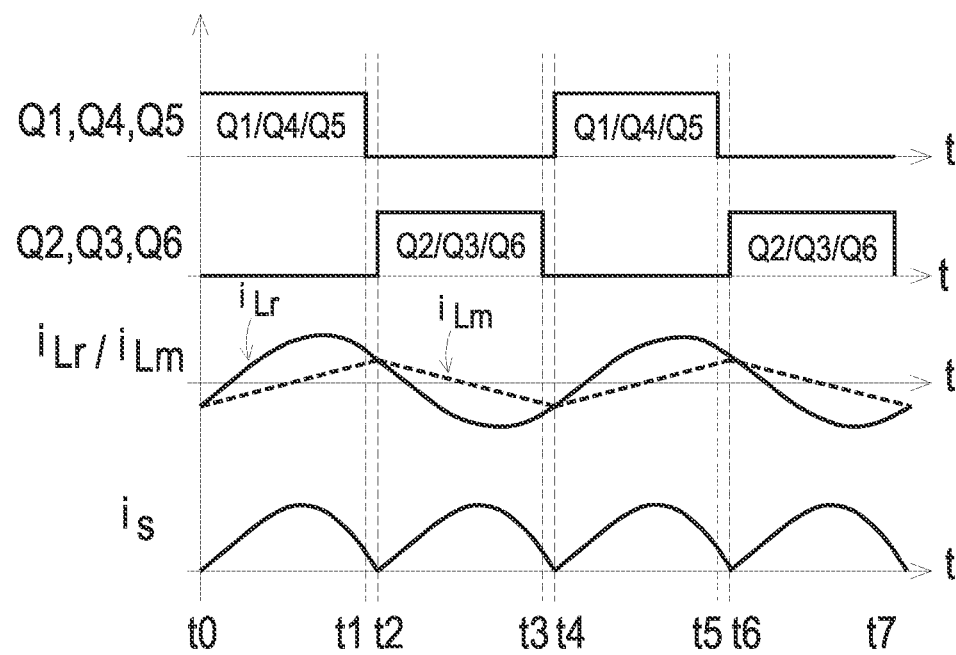
FIG. 5 is a schematic current waveform diagram of the converter of FIG. 1.

When two terminals of the second bridge arm 122 of the first side switching circuit 12 are coupled to the first positive terminal V1+ and the second positive terminal V2+ respectively, the detailed working principle and waveform of the circuit are shown in FIGS. 4 and 5. FIG. 4 is a schematic voltage waveform diagram of the converter of FIG. 1. The voltage waveforms of the voltage $V_{AB}$ between the first node A and the second node B, the voltage $V_{CB}$ between the third node C and the second node B, the voltage $v_{Cr}$ of the resonant capacitor Cr, the voltage $V_{Lr}$ of the resonant inductor Lr and the second side voltage ripple $\Delta V2$ are shown in FIG. 4. The transmission mode of the current flowing from the first end 10 to the second end 11 in the first working state is different from that in the second working state. Therefore, the amplitude of the second side voltage ripple $\Delta V2$ in one switching cycle will not be constant, and the frequency of the second side voltage ripple $\Delta V2$ is equal to the switching frequency of the switching circuit. For example, in the first working state, when the first switch Q1, the fourth switch Q4 and the fifth switch Q5 are turned on, the current flowing into the second side voltage V2 is relatively larger. In the second working state, when the second switch Q2, the third switch Q3 and the sixth switch Q6 are turned on, the current flowing into the second side voltage V2 is relatively smaller. In other words, the variation amplitude of the second side voltage ripple $\Delta V2$ in the first working state is greater than that in the second working state.

FIG. 5 is a schematic current waveform diagram of the converter of FIG. 1. Here, $i_{Lr}$ represents the current flowing through the resonant inductor Lr, $i_{Lm}$ represents the current flowing through the magnetizing inductor Lm, and $i_s$ represents the current flowing through the second side winding T2, and the current waveforms of the currents $i_{Lr}$, $i_{Lm}$, and $i_s$ are shown in FIG. 5. In the first working state, the current of the first end 10 flows through the first side switching circuit 12 and the transformer T, and then is transmitted to the second end 11 through the second side switching circuit 13, and the current flowing through the first side winding T1 is $i_p=i_{Lr}-i_{Lm}$, and the current flowing through the second side winding T2 through the coupling is $i_s=N \cdot i_p$. At the same time, the current $i_{Lr}$ flows directly to the second positive terminal V2+ through the fourth switch Q4, and the load current of the converter 1 is the DC component of the sum of the currents $i_s$ and $i_{Lr}$.

In the second working state, the current of the first end 10 flows through the first side switching circuit 12 and the transformer T, and then is transmitted to the second end 11 through the second side switching circuit 13. The current flowing through the first side winding T1 is also $i_p=i_{Lr}-i_{Lm}$. The current flowing through the second side winding T2 is $i_s=N \cdot i_p$. Therefore, the load current of the converter 1 is only the DC component of the current $i_s$, and its current waveform is also shown in FIG. 5.

Figure 6:
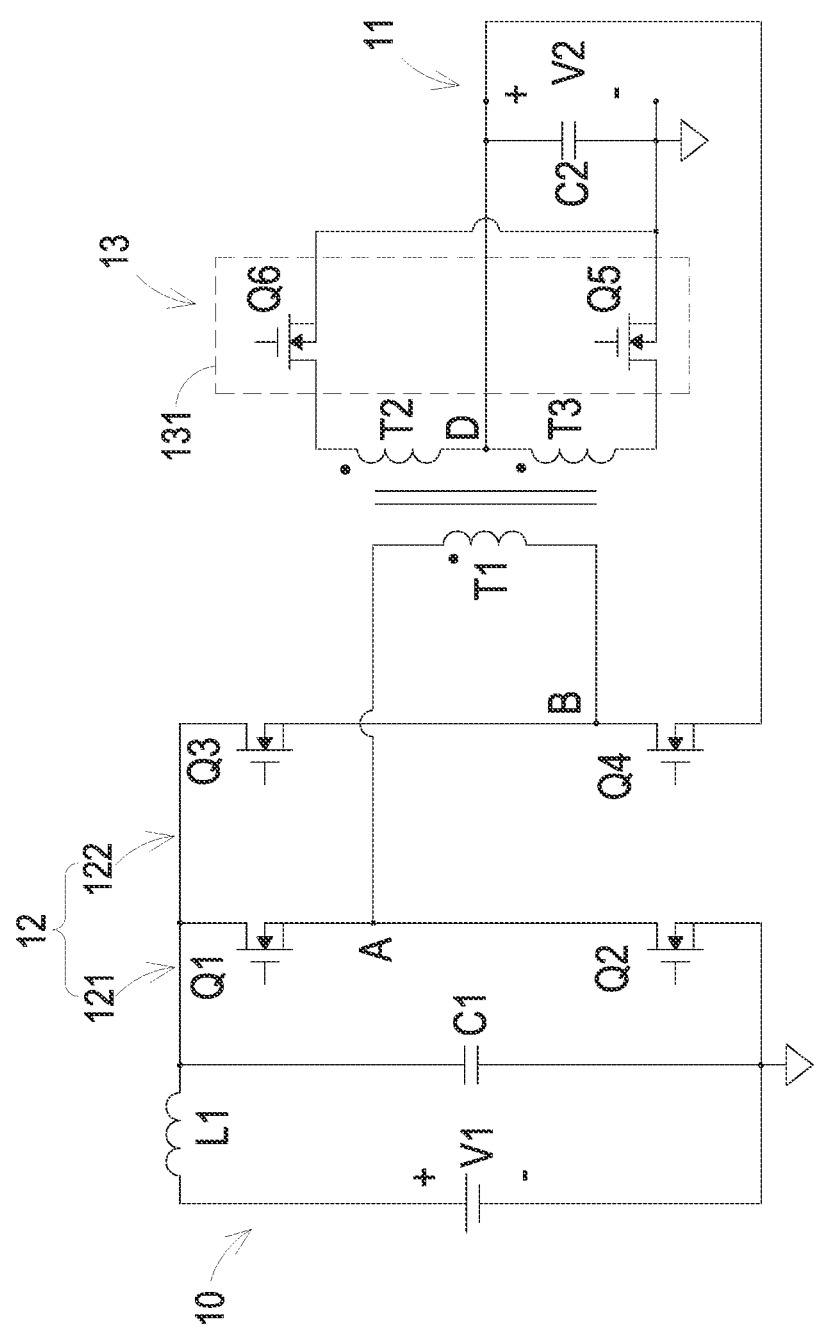
FIG. 6 is a schematic circuit diagram illustrating a converter according to another embodiment of the present disclosure.

In some embodiments, the converter 1 is not limited to the full-bridge LLC resonant converter, and the voltage conversion ratio of non-integer multiple can still be realized. The implementation of other embodiment of the converter 1 is exemplified as follow. Please refer to FIG. 6. FIG. 6 is a schematic circuit diagram illustrating a converter according to another embodiment of the present disclosure. The converter 1a of this embodiment is a switched capacitor converter. Compared to the converter 1 of FIG. 1, the converter 1a of FIG. 6 does not have a resonant capacitor Cr and a resonant inductor Lr, and the magnetizing inductor Lm is not shown. The converter 1a of this embodiment further includes a first inductor L1. In addition, similar components in the converter 1a of this embodiment and the converter 1 shown in FIG. 1 are denoted by the same reference numerals, and the detailed descriptions thereof are omitted herein. In this embodiment, the first inductor L1 is coupled in series between the first positive terminal V1+ and the first capacitor C1, and the first side voltage V1 and the first inductor L1 form a constant current source. Further, the transformer T has leakage inductance. By reducing the capacitance of the first capacitor C1, the first capacitor C1 and leakage inductance of the transformer T can generate an oscillating current collaboratively.

Figure 7:
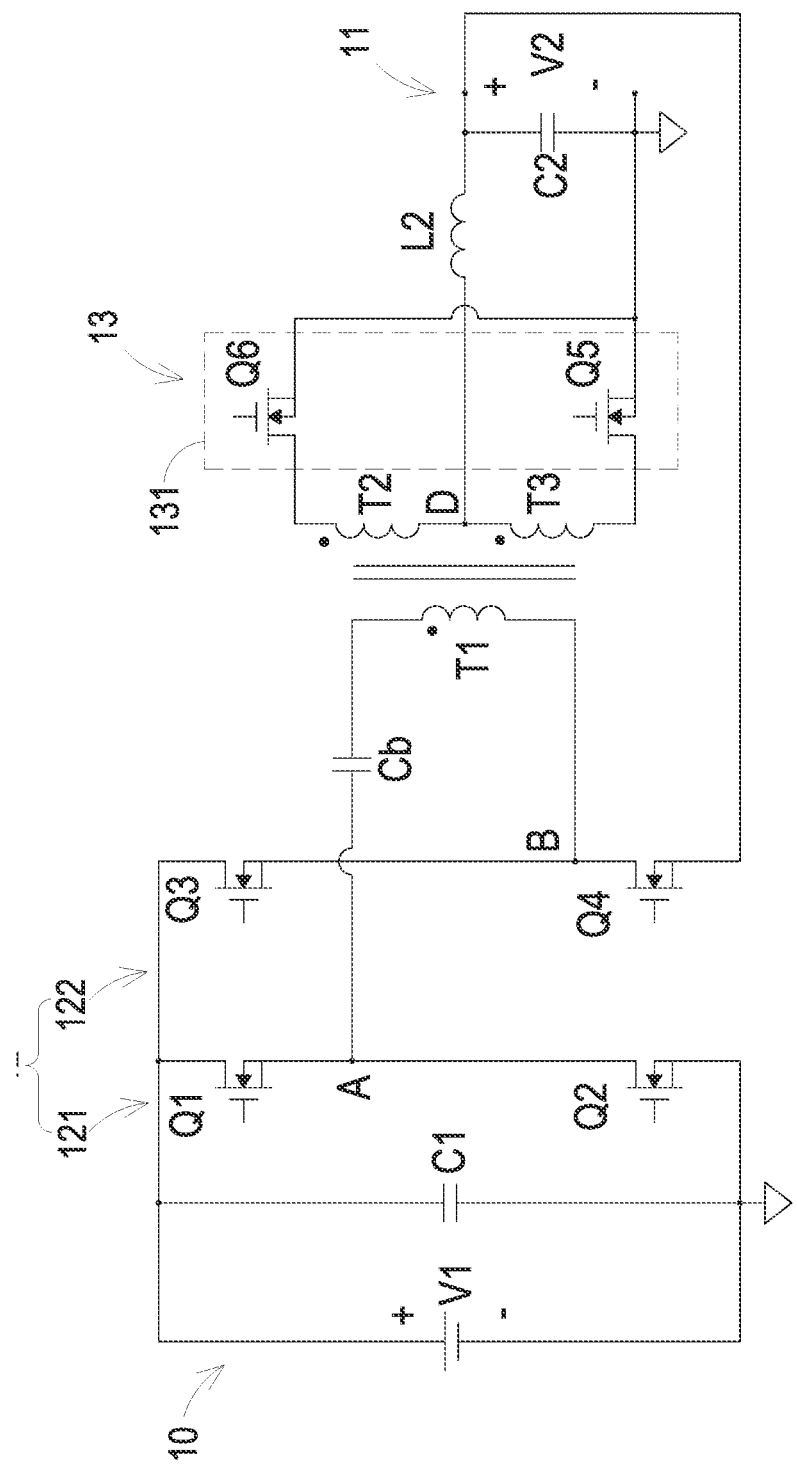
FIG. 7 is a schematic circuit diagram illustrating a converter according to further another embodiment of the present disclosure.

Please refer to FIG. 7, FIG. 7 is a schematic circuit diagram illustrating a converter according to further another embodiment of the present disclosure. The converter 1b of this embodiment is a hard-switching full-bridge converter. Compared to the converter 1 of FIG. 1, the converter 1b of FIG. 7 does not have a resonant capacitor Cr and a resonant inductor Lr, and the converter 1b of this embodiment further includes a second inductor L2 and the DC blocking capacitor Cb. In addition, the similar components of the converter 1b of this embodiment and the converter 1 shown in FIG. 1 are denoted by the same reference numerals, and the detailed descriptions thereof are omitted herein. In this embodiment, the second inductor L2 is coupled in series between the second side switching circuit 13 and the second capacitor C2, and the DC blocking capacitor Cb is coupled in series between the first side winding T1 and the first node A. Further, the transformer T has leakage inductance.

It should be noted that in all the above-mentioned embodiments in the present disclosure, the description of "equal" is not absolutely "equal". For example, the switching frequency of the switching circuit is equal to the resonant frequency, and the term "equal" has a tolerance within ±10%. That is, the switching frequency of the switching circuit can be 90%~110% of the resonant frequency. Similarly, in all the above-mentioned embodiments of the present disclosure, there may be some tolerances in the numerical description like "duty cycle is 50%", "the resonant frequency is equal to the switching frequency", "N+0.5" or "0", etc., and the tolerances are all within ±10%.

From the above descriptions, the present disclosure provides a converter. The turns ratio of the first side winding and the second side winding of the transformer is N:1. A non-integer voltage conversion ratio can be achieved through adjusting the connection arrangement of the switching circuit at the high voltage side. Because the number of turns of the transformer winding does not increase, the winding loss does not increase. Further, since the switching frequency of the switching circuit is approximately equal to the resonant frequency, it is convenient to design and optimize the resonant parameters. In addition, the inductance of the resonant inductor is reduced, which causes the magnetizing inductance of the transformer to be increased, thereby improving the conversion efficiency of the converter.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A converter, comprising:
a first end having a first positive terminal and a first negative terminal;
a second end having a second positive terminal and a second negative terminal;
a first side switching circuit coupled to the first end, comprising:
a first bridge arm, wherein two terminals of the first bridge arm are coupled to the first positive terminal and the first negative terminal respectively; and
a second bridge arm, wherein two terminals of the second bridge arm are coupled to the first positive terminal and the second positive terminal respectively;
a second side switching circuit coupled to the second end; and
a transformer between the first side switching circuit and the second side switching circuit, wherein the transformer comprises at least one first side winding and at least one second side winding magnetically coupled to each other, and the first side winding is coupled to the first side switching circuit, and the second side winding is coupled to the second side switching circuit;
wherein a turn ratio of the at least one first side winding and the at least one second side winding is N:1, and a voltage conversion ratio of the first end and the second end is N+0.5:1, where N is a positive integer.

2. The converter according to claim 1, wherein the first bridge arm comprises a first switch and a second switch coupled in series, and a first node is defined as a common node of the first switch and the second switch, and the second bridge arm comprises a third switch and a fourth switch coupled in series, and a second node is defined as a common node of the third switch and the fourth switch, and two terminals of the first side winding are coupled to the first node and the second node respectively.

3. The converter according to claim 2, further comprising a first capacitor and a second capacitor, wherein the first capacitor is coupled to the first end in parallel, and the second capacitor is coupled to the second end in parallel.

4. The converter according to claim 3, wherein a first inductor is serially coupled between the first positive terminal and the first capacitor, and the first inductor and a voltage of the first end are configured to form a constant current source, and the transformer has a leakage inductance, and the first capacitor and the leakage inductance of the transformer generate an oscillating current collaboratively.

5. The converter according to claim 4, wherein the converter has a first working state and a second working state, and a duty cycle of the first working state and a duty cycle of the second working state of the converter are both 50%,
wherein in the first working state, the first switch and the fourth switch are turned on, and the second switch and the third switch are turned off, and in the second working state, the first switch and the fourth switch are turned off, the second switch and the third switch are turned on;
wherein the first switch and the fourth switch in the first working state have a first conduction phase, and the second switch and the third switch in the second working state have a second conduction phase, the phase difference is substantially equal to 180 degrees between the first conduction phase and the second conduction phase.

6. The converter according to claim 5, wherein a DC component of a voltage of the resonant capacitor is one half of a voltage of the second end.

7. The converter according to claim 5, wherein in the first working state, the current at the first end flows into the second end through the first side switching circuit, the transformer and the second side switching circuit in sequence, and simultaneously the current at the first end flows into the second positive terminal through the first side switching circuit.

8. The converter according to claim 5, wherein a frequency of a ripple voltage of the second end is equal to a switching frequency of the first side switching circuit and the second side switching circuit, and a variation amplitude of the ripple voltage of the second end in the first working state is greater than that in the second working state.

9. The converter according to claim 3, wherein a second inductor is serially coupled between the second side winding and the second capacitor, and a DC blocking capacitor is serially coupled between the first side winding and the first node.

10. The converter according to claim 9, wherein the converter has a first working state and a second working state, and a duty cycle of the first working state and a duty cycle of the second working state of the converter are both 50%, wherein in the first working state, the first switch and the fourth switch are turned on, and the second switch and the third switch are turned off, and in the second working state, the first switch and the fourth switch are turned off, the second switch and the third switch are turned on;

wherein the first switch and the fourth switch in the first working state have a first conduction phase, and the second switch and the third switch in the second working state have a second conduction phase, the phase difference is substantially equal to 180 degrees between the first conduction phase and the second conduction phase.

11. The converter according to claim 10, wherein a DC component of a voltage of the resonant capacitor is one half of a voltage of the second end.

12. The converter according to claim 10, wherein in the first working state, the current at the first end flows into the second end through the first side switching circuit, the transformer and the second side switching circuit in sequence, and simultaneously the current at the first end flows into the second positive terminal through the first side switching circuit.

13. The converter according to claim 10, wherein a frequency of a ripple voltage of the second end is equal to a switching frequency of the first side switching circuit and the second side switching circuit, and a variation amplitude of the ripple voltage of the second end in the first working state is greater than that in the second working state.

14. The converter according to claim 2, further comprising a resonant capacitor and a resonant inductor, wherein the resonant capacitor and the resonant inductor are serially coupled between the first node and the second node, and the resonant capacitor and the resonant inductor have a resonant frequency, and the resonant frequency is substantially equal to a switching frequency of the first side switching circuit, and the resonant inductor is configured to be a leakage inductance of the transformer or an inductor outside the transformer.

15. The converter according to claim 14, wherein the converter has a first working state and a second working state, a duty cycle of the first working state and a duty cycle of the second working state of the converter are both 50%, wherein in the first working state, the first switch and the fourth switch are turned on, and the second switch and the third switch are turned off, and in the second working state, the first switch and the fourth switch are turned off, the second switch and the third switch are turned on;

wherein the first switch and the fourth switch in the first working state have a first conduction phase, and the second switch and the third switch in the second working state have a second conduction phase, the phase difference is substantially equal to 180 degrees between the first conduction phase and the second conduction phase.

16. The converter according to claim 15, wherein a DC component of a voltage of the resonant capacitor is one half of a voltage of the second end.

17. The converter according to claim 15, wherein in the first working state, the current at the first end flows into the second end through the first side switching circuit, the transformer and the second side switching circuit in sequence, and simultaneously the current at the first end flows into the second positive terminal through the first side switching circuit.

18. The converter according to claim 15, wherein a frequency of a ripple voltage of the second end is equal to a switching frequency of the first side switching circuit and the second side switching circuit, and a variation amplitude of the ripple voltage of the second end in the first working state is greater than that in the second working state.

* * * * *